US008702182B2

(12) United States Patent
Fischbach-Borazio et al.

(10) Patent No.: US 8,702,182 B2
(45) Date of Patent: Apr. 22, 2014

(54) HYDRAULIC UNIT

(75) Inventors: Petra Fischbach-Borazio, Frankfurt (DE); Heiko Gastauer, Losheim am See (DE); Axel Hinz, Neu-Anspach (DE); Uwe Greiff, Seligenstadt (DE)

(73) Assignee: Continental Teves AG & Co. oHG (DE)

( * ) Notice: Subject to any disclaimer, the term of this patent is extended or adjusted under 35 U.S.C. 154(b) by 492 days.

(21) Appl. No.: 12/988,911

(22) PCT Filed: Apr. 22, 2009

(86) PCT No.: PCT/EP2009/054763
§ 371 (c)(1),
(2), (4) Date: Oct. 21, 2010

(87) PCT Pub. No.: WO2009/132994
PCT Pub. Date: Nov. 5, 2009

(65) Prior Publication Data
US 2011/0036434 A1  Feb. 17, 2011

(30) Foreign Application Priority Data

Apr. 28, 2008 (DE) .......................... 10 2008 021 088
Jun. 21, 2008 (DE) .......................... 10 2008 029 536

(51) Int. Cl.
*B60T 8/36* (2006.01)

(52) U.S. Cl.
USPC .......... 303/119.3; 303/DIG. 10; 303/DIG. 11

(58) Field of Classification Search
USPC ................. 303/119.3, 119.2, 116.4, DIG. 10, 303/DIG. 11; 137/560, 861, 884; 251/129.15, 129.01; 417/415
See application file for complete search history.

(56) References Cited

U.S. PATENT DOCUMENTS

| | | | |
|---|---|---|---|
| 5,577,813 A | 11/1996 | Zaviska | |
| 6,260,582 B1 | 7/2001 | Trautmann | |
| 6,260,933 B1 * | 7/2001 | Dinkel et al. | 303/113.1 |
| 6,398,315 B1 * | 6/2002 | Dinkel et al. | 303/113.1 |
| 6,428,121 B1 * | 8/2002 | Dinkel et al. | 303/191 |
| 6,688,707 B1 * | 2/2004 | Dinkel et al. | 303/119.3 |
| 7,018,003 B2 * | 3/2006 | Otto et al. | 303/119.3 |
| 7,118,183 B2 * | 10/2006 | Hinz et al. | 303/119.3 |
| 7,131,463 B2 * | 11/2006 | Schlitzkus et al. | 138/41 |
| 7,322,658 B2 * | 1/2008 | Hinz et al. | 303/119.3 |
| 7,441,843 B2 * | 10/2008 | Otto | 303/119.3 |
| 7,753,456 B2 * | 7/2010 | Iyatani | 303/119.3 |
| 7,963,619 B2 * | 6/2011 | Hinz et al. | 303/119.3 |
| 2004/0056529 A1 * | 3/2004 | Otto | 303/119.3 |
| 2005/0057092 A1 | 3/2005 | Segawa | |
| 2006/0056995 A1 | 3/2006 | Dinkel et al. | |
| 2007/0096553 A1 | 5/2007 | May et al. | |

(Continued)

FOREIGN PATENT DOCUMENTS

DE  197 16 187 A1  10/1998
DE  198 05 843 A1   5/1999

(Continued)

*Primary Examiner* — Thomas J Williams
*Assistant Examiner* — Mariano Sy
(74) *Attorney, Agent, or Firm* — RatnerPrestia

(57) ABSTRACT

A hydraulic unit for a slip-controlled braking system includes a housing body provided with a flange surface into which at least one additional bore joins. The bore, in addition to a cable through bore arranged in the housing body, is covered by an electromotor and/or a control device. The additional bore is either a leakage receiving bore or a noise reducing chamber.

12 Claims, 4 Drawing Sheets

(56) References Cited

U.S. PATENT DOCUMENTS

2007/0110590 A1     5/2007   Pabst et al.
2008/0258544 A1*   10/2008   Iyatani .......................... 303/10
2009/0008199 A1*   1/2009   Hinz et al. .................... 188/345

FOREIGN PATENT DOCUMENTS

| | | |
|---|---|---|
| DE | 199 58 194 A1 | 1/2001 |
| DE | 202 12 236 U1 | 11/2002 |
| DE | 103 39 882 A1 | 1/2005 |
| DE | 103 53 834 A1 | 6/2005 |
| DE | 10 2004 044 400 A1 | 8/2005 |
| DE | 10 2004 060 079 A1 | 2/2006 |
| DE | 10 2005 010 743 A1 | 4/2006 |
| EP | 0 687 606 B1 | 12/1995 |
| EP | 0 770 530 A2 | 5/1997 |
| EP | 1 746 288 A2 | 1/2007 |
| JP | 7-47944 | 2/1995 |
| WO | WO 97/48583 | 12/1997 |
| WO | WO 00/46089 | 8/2000 |

* cited by examiner

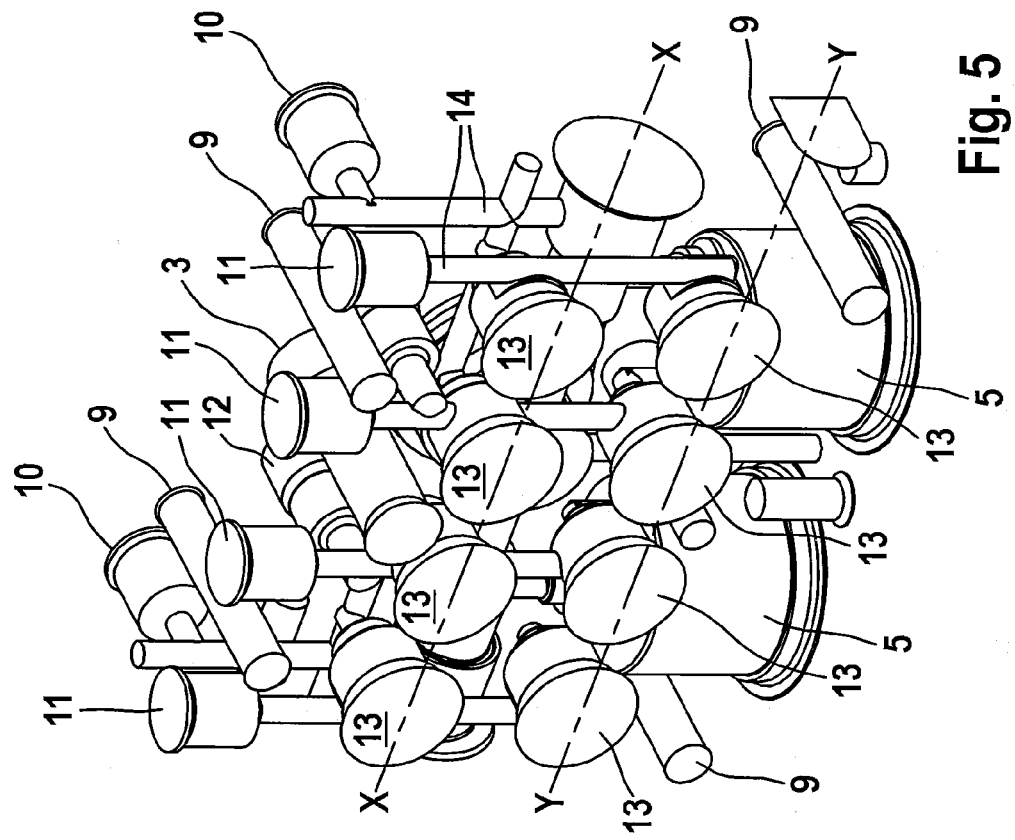
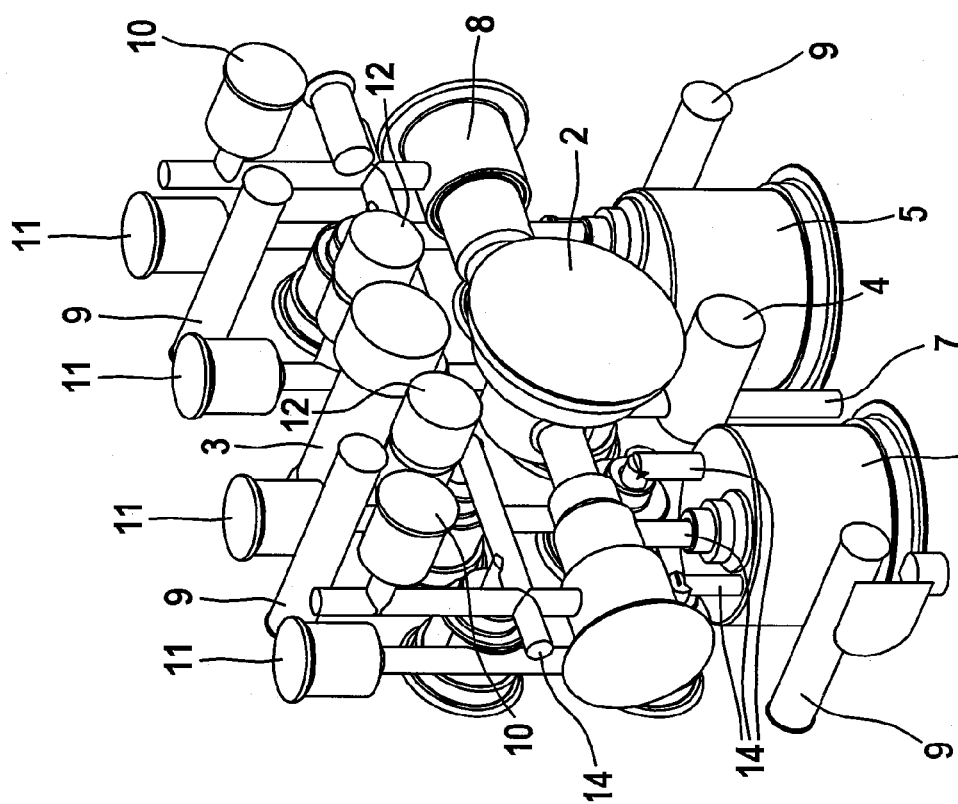

HYDRAULIC UNIT

CROSS REFERENCE TO RELATED APPLICATIONS

This application is the U.S. national phase application of PCT International Application No. PCT/EP2009/054763, filed Apr. 22, 2009, which claims priority to German Patent Application No. 10 2008 021 088.9, filed Apr. 28, 2008, and German Patent Application No. 10 2008 029 536.1, filed Jun. 21, 2008, the contents of such applications being incorporated by reference herein.

FIELD OF THE INVENTION

The invention relates to a hydraulic unit for a slip-controlled brake system.

BACKGROUND OF THE INVENTION

A hydraulic unit of the abovementioned type is already known from EP 0 687 606 B1, which is incorporated by reference. The hydraulic unit comprises a housing body in the form of a block, which accommodates inlet valves and outlet valves in a plurality of valve holding bores of a first and a second valve row for the purpose of antilock control. Also arranged in the housing body is a pump bore, which is aligned transversely to the direction of entry of the valve holding bores into the housing body, having a motor holding bore, which is directed perpendicularly to the pump bore, and having a plurality of pressure medium ducts, which connect the valve holding bores and the pump bore and which are capable of establishing a hydraulic connection between the brake pressure master ports opening into the housing body and a plurality of wheel brake ports. A cable through bore is furthermore provided in the housing body for electrical connection to an electric motor.

SUMMARY OF THE INVENTION

It is an object of the invention to make a hydraulic unit of the type stated as simple, economical and miniaturizable as possible without having to accept restrictions in terms of functionality, e.g. immersion tightness and/or noise behavior.

BRIEF DESCRIPTION OF THE DRAWINGS

The invention is best understood from the following detailed description when read in connection with the accompanying drawings. Included in the drawings is the following features:

FIG. 5 shows a diametrical view of the end of the housing body which has the valve holding bores, this view being intended to complement the illustrating in FIG. 4.

DETAILED DESCRIPTION OF THE PREFERRED EMBODIMENTS

Figure 1:
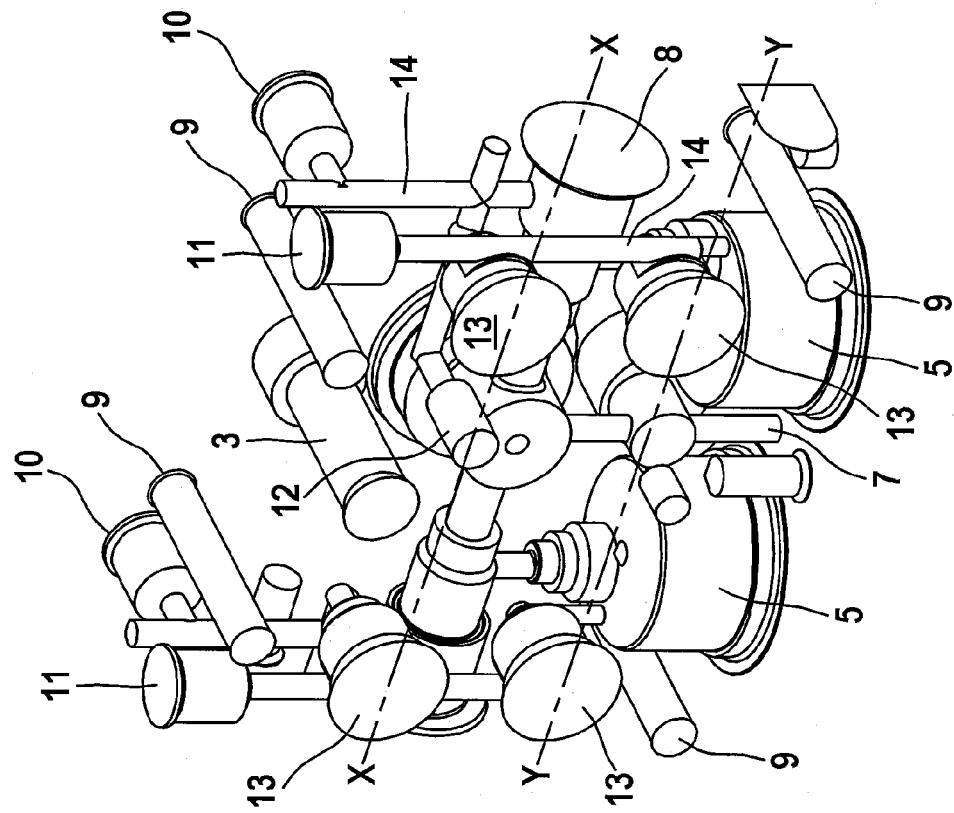
FIG. 1 shows, in perspective representation, the housing body for the hydraulic unit according to aspects of the invention in a top view of the end face of the housing body, said end face forming the flange surface for an electric motor.

Before the special features of the individual illustrative embodiments are described with reference to FIGS. 1-6, the common features and the basic structure of the subject matter of the invention will first of all be explained.

As a fundamental feature, each of the hydraulic units that can be seen in FIGS. 1-6 has a housing body 6 in the form of a block for an antilock braking system, which accommodates a plurality of inlet valves in a plurality of valve holding bores 13 of a first valve row X and a plurality of outlet valves in a second valve row Y. Also arranged in the housing body is a horizontal through pump bore 8 for accommodating a dual circuit radial piston pump, which is aligned between the two valve rows X, Y, transversely to the direction of entry of the valve holding bores 13. Opening into the pump bore 8, halfway along the latter, is a motor holding bore 2 for an electric motor, said bore being directed parallel to the valve holding bores 13 into a flange surface 1 of the housing body 6. To enable the electric motor to be connected to a control unit, which is aligned diametrically with respect to the electric motor on the housing body 6, the housing body 6 has a cable through bore 3, which is covered by the electric motor as soon as the electric motor is fastened to the flange surface 1. A pair of low pressure accumulator bores 5 arranged in parallel open into the housing body 6 transversely to the valve holding bores 13, directly next to the second valve row Y. Like the valve holding bores 13 and the pump bores 8, the low pressure accumulator bores 5 are connected to pressure medium ducts 14, which are arranged on the recirculation principle for the usually closed ABS brake circuits in order to enable a hydraulic connection to be established between two brake pressure master ports 10 opening into the housing body 6 and a plurality of wheel brake ports 11, irrespective of whether the antilock system is a 2-channel, 3-channel or 4-channel version.

To enable the hydraulic unit to be miniaturized, the boring of the housing body 6 which has already been explained is used as a basis for optimum positioning of further bores in the housing body 6, and, like the cable through bore 3, said bores can advantageously be covered or closed by the electric motor and/or the control unit.

In order to be able to guarantee the immersion tightness and leakproofness of the hydraulic unit, the invention makes provision for one of the further bores required to be designed as a blind bore, which assumes the function of a leakage receiving bore 4. Said leakage receiving bore 4 opens into the housing body 6 between the low pressure accumulator bores 5 and the second valve row Y, parallel to the cable through bore 3, at a distance defined substantially by the position and size of the motor holding bore 2. This ensures that, when the electric motor is inserted into the motor holding bore 2, not only is the electrical contact arrangement for the electric motor within the cable through bore 3 closed, but also the leakage receiving bore 4 can preferably be covered and closed through appropriate configuration of the electric motor.

The leakage receiving bore 4 is advantageously connected via a leakage duct 7 extending in the housing body 6 transversely to the cable through bore 3 to a region within the motor holding bore 2 which carries away the pump leakage and into which the pump bore 8 opens. For this purpose, the leakage duct 7, like the low pressure accumulator bores 5, extends parallel to the flange surface 1 into a first side face A1 of the holding body 6, the leakage duct 7 being arranged between the two low pressure accumulator bores 5 and being closed at the first side face A1, preferably by means of a blind plug or a ball.

To ensure that, as part of miniaturization of the hydraulic unit, an arrangement for fastening the electric motor to the housing body 6 which is as simple, space-saving and reliable as possible is obtained, and that satisfactory electrical contact between the control unit, which is to be arranged diametrically with respect to the electric motor on the housing body 6, is possible, at least one pair of through bores 9 in each case passes through the housing body 6, preferably on both sides of the cable through bore 3 and also next to the two low pressure accumulator bores 5, into which bores a plurality of screws required for fastening the electric motor to the housing body 6 are inserted after the closure of the cable through bore 3 and the leakage receiving bore 4 by the electric motor, said screws connecting the control unit to the electric motor by the tie bolt principle. This simple means of connecting and fastening the electric motor with the control unit to the housing body 6 results in better space utilization within the control unit for positioning electronic components, especially the circuit board, and improved assembly suitable for automation. Given appropriately rigid design of the control unit housing, it is furthermore possible to reduce the number of screws required and hence to reduce the usual number of four through bores 9 required, although it is necessary in all cases to retain the two through bores 9 arranged next to the cable through bore 3 in order in general to ensure electrical contacting—dependent on axial forces—within the cable through bore 3 under all operating conditions.

In FIGS. 1-6, the through bores 9 pass through the housing body 6 and also the periphery of the electric motor parallel to the leakage receiving bore 4, with the result that adequate sealing between the leakage receiving bore 4 and the electric motor base plate, which is to be pressed against the flange surface 1 by the screwed joint, is ensured. Moreover, the tie bolt principle has the advantage that, if desired or if required, the housing body 6 can be fitted with the electric motor and the control unit simultaneously from both diametrical end faces and screwed to them in a single operation under the action of equal tensioning forces.

It is furthermore apparent from FIGS. 1-6 that a pair of brake pressure master ports 10, which each have a spacing relative to the cable through bore 3 to accommodate further through bores 9 required for the screw fastening of the electric motor, advantageously open into the flange surface 1 on both sides of the cable through bore 3 in order to minimize the dimensions of the housing body 6. This has the advantage that the brake pressure master ports 10 are easily accessible next to the electric motor and can be screwed to the brake lines using commercially available tools.

The two brake pressure master ports 10 preferably open into the flange surface 1 directly next to the first valve row X, the brake pressure master ports 10 being arranged approximately in a section plane of the housing body 6 in which are also aligned a plurality of wheel brake ports 11, which open into a second end face A2 arranged diametrically with respect to the first end face A1 and, as a result, can likewise be screwed to the brake lines in an easy-to-assemble manner.

Through the skillful arrangement of the individual bores as explained at the outset, there remains between the cable through bore 3 and the first valve row X a free space for the integration of up to two noise damping chambers 12, which open into the housing body 6 as blind bores, preferably next to the cable through bore 3.

Figure 2:
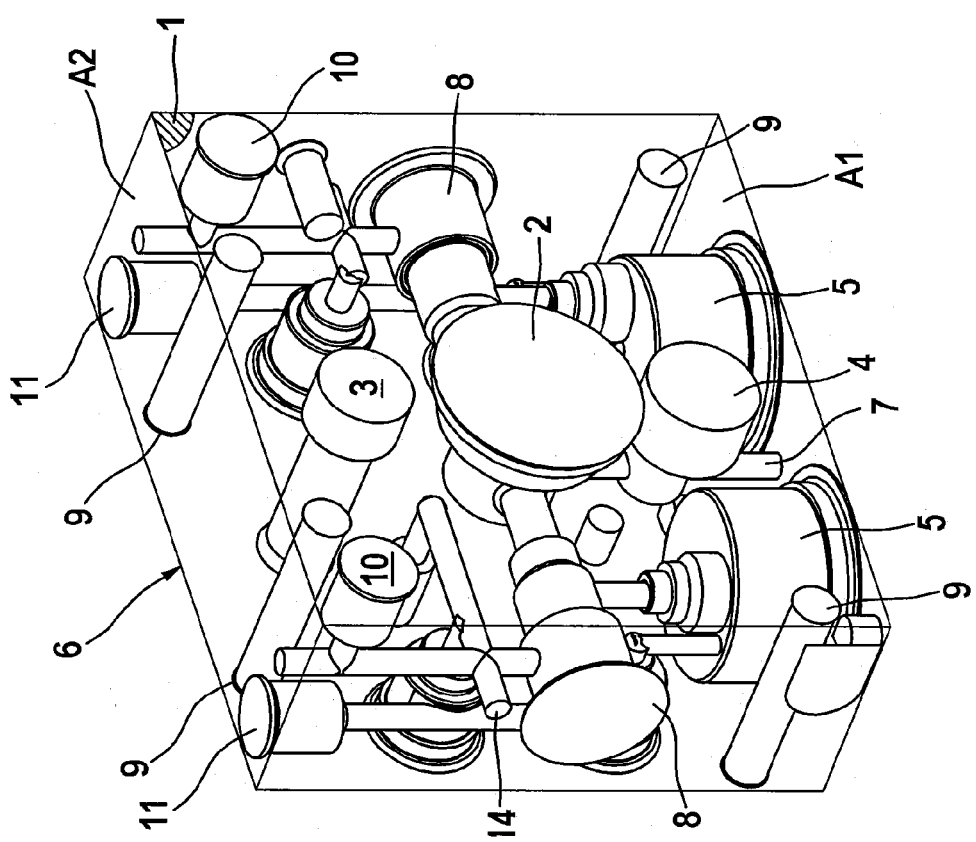
FIG. 2 shows the hydraulic unit according to FIG. 1 in a diametrical view, giving a top view of the end face of the housing body, into which face the valve holding bores provided for the inlet and outlet valves open, FIG. 3 starting from the concept for the housing body shown in FIGS. 1 and 2, which is configured for a 2-channel ABS hydraulic unit, then shows an expansion of the housing body to give a 3-channel ABS hydraulic unit, which is shown in a top view of the end face provided with the valve holding bores for the sake of illustrating significant features, FIG. 4 starting from the concepts shown in FIGS. 1-3, shows a holding body which is configured for a 4-channel ABS hydraulic unit, shown in a top view of the end which can be connected to the electric motor.
Figure 3:
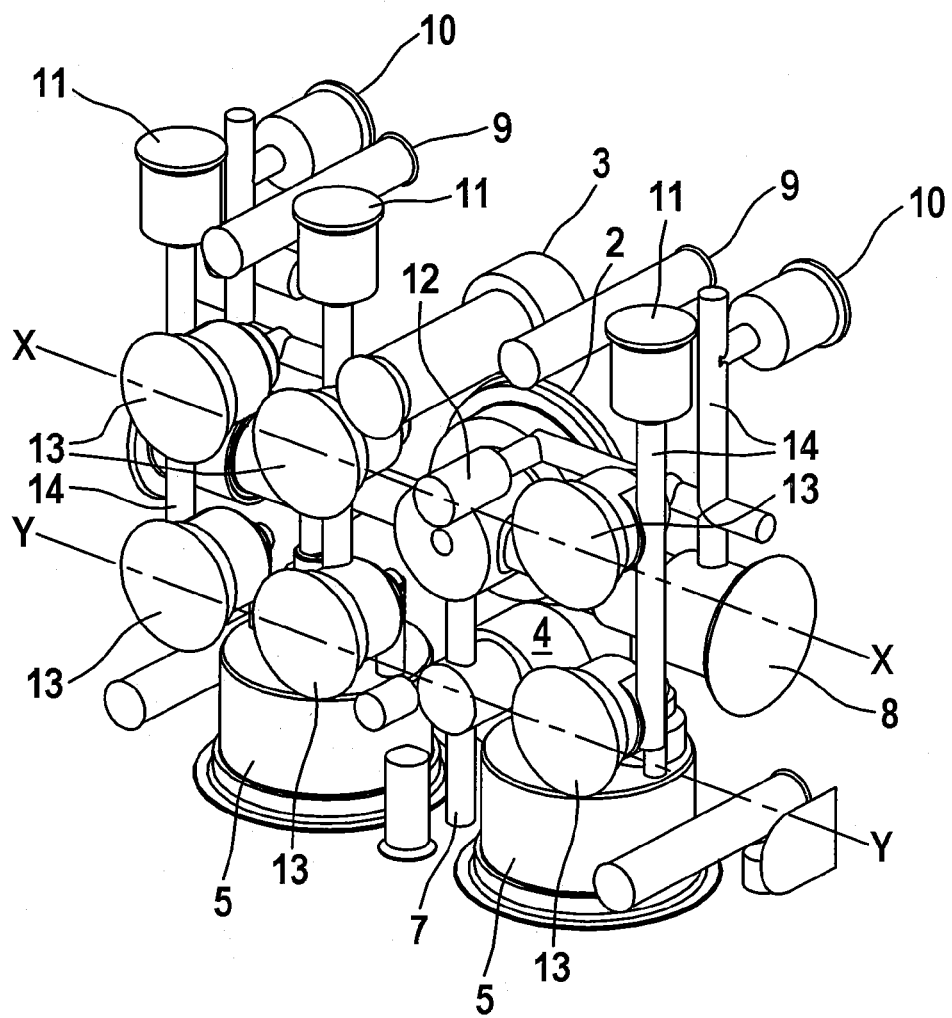
Figure 6:
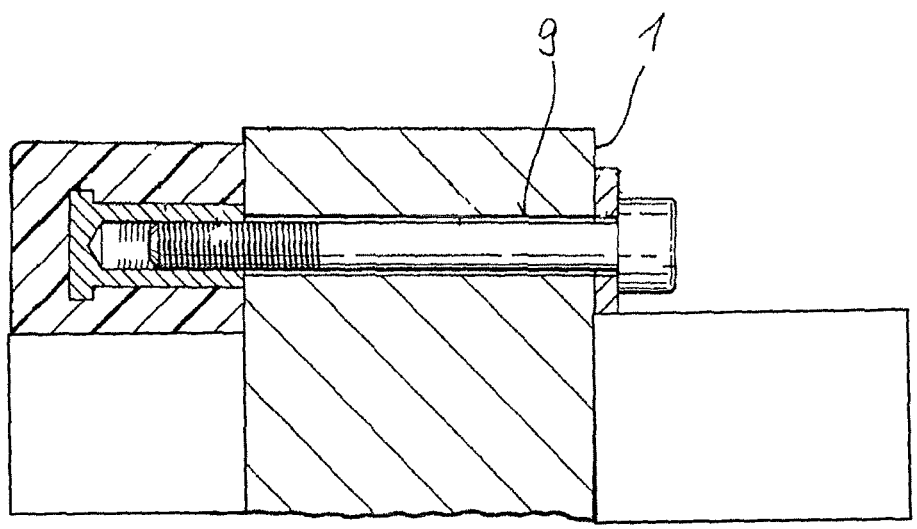
FIG. 6 shows a partial cross-sectional view of the housing body shown in FIGS. 1 and 2, and includes depictions of an electric motor and a control unit attached thereto.

According to FIGS. 1-3, the noise damping chamber 12 is arranged between the first valve row X and, according to FIGS. 4 and 5, it is arranged outside the first valve row X and is in each case connected to a pressure medium duct 14 leading from the pump bore 8 to the first valve row X, with the result that the pressure pulses caused by the pump pistons in the pump bore can escape into the noise damping chamber(s) 12.

For the sake of optimum positioning in terms of installation space, each noise damping chamber 12 is also arranged parallel to the cable through bore 3 in the housing body 6, for which purpose the noise damping chamber 12 is bounded both by the cable through bore 3, one of the two brake pressure master ports 10 and also by a through bore 9 and the first valve row X. By virtue of this compact arrangement, each noise damping chamber 12 is covered either by the control unit or by the electric motor after the final assembly of the hydraulic unit.

The further details and significant differences between the illustrative embodiments depicted in FIGS. 1-6 will now be explained.

FIGS. 1 and 2 show a first embodiment of the housing body 6 in a perspective representation for use in a motorcycle, for which purpose the housing body 6 has the four valve holding bores 13 required for use as a 2-channel/2-circuit antilock system. The two electromagnetically actuable inlet valves are located in the two valve holding bores 13 of the first valve row X, while the two electromagnetically actuable outlet valves are inserted in the two valve holding bores 13 of the second valve row Y. To enable the required pressure medium ducts 14 to be made as short and straight as possible, there is in each case one inlet valve and one outlet valve in the associated valve holding bores 13, which are aligned in the housing body 6, as far as possible in the connection plane of the brake pressure master and wheel brake ports 10 and 11 required for each brake circuit of the dual circuit brake system. Since, for the sake of simple connection to the valve holding bores 13 and the pump bore 8 via the associated pressure medium ducts 14, the two brake pressure master and wheel brake ports 10, 11 are situated as far out as possible on the housing body 6, there is a sufficiently large horizontal interspace for the arrangement of two through bores 9, between which the cable through bore 3 and, laterally thereunder, the noise damping chamber 12 can be appropriately positioned. Owing to the sufficiently large spacing between the two valve holding bores 13 of the first valve row X, the noise damping chamber 12, which is embodied as a blind bore, is arranged in the first valve row X, and the noise damping chamber 12 is thus connected directly to the pressure medium duct 14 branching off from the brake pressure master port 10 to the first valve row X and the pressure side of the pump bore 8. Although just one noise damping chamber 12 for one of the two brake circuits is shown in FIGS. 1 and 2, it is, of course, also possible for the second brake circuit to be provided in the same way with a noise damping chamber 12, if desired or if required.

FIGS. 1 and 2 furthermore disclose the two low pressure accumulator bores 5, which open from below into the housing body 6 as close as possible to the second valve row Y and on the vertical line of the respective inlet and outlet valve holding bores situated on the outside in the two valve rows X, Y in order to ensure as short as possible a connection to the pump suction side of the pump bore 8 and to the valve holding bores 13 of the second valve row Y. In each case, this gives a straight connection between each low pressure accumulator bore 5 and both the suction side of the pump bore 8 and the valve holding bores 13 of the second valve row Y, by means of a short pressure medium duct 14.

FIG. 3 illustrates a functional expansion of the housing body 6 known from FIGS. 1 and 2, according to which, in FIG. 3, the horizontal interspace known from FIGS. 1 and 2 between the two valve rows X, Y now has added to it two further valve holding bores 13 together with the associated wheel brake port 11 in order to form a 3-channel antilock system, without thereby necessitating a change as regards the fundamental block boring known from FIGS. 1 and 2.

Finally, starting from the basic concept of the block boring described previously, inter alia, with reference to FIGS. 1 and 2, FIGS. 4 and 5 show an enhancement to the housing body 6 to give a 4-channel dual circuit antilock system, for which purpose, with reference to FIG. 3, another two valve holding bores 13 are introduced into the horizontal interspace between the two valve rows X, Y together with an associated wheel brake port 11, the special feature being that the alignment, known from FIGS. 1-3, of the noise damping chamber 12 between the valve holding bores 13 cannot be retained for reasons of space, for which reason, for the sake of simplicity, the two noise damping chambers 12 in FIGS. 4 and 5 open into the housing body 6 as blind bores from the flange surface 1 in the direction of the valve holding bores 13 of the first valve row X and are there connected in each case via the pressure medium duct 14 leading to the pressure side of the pump bore 8 and the first valve row X. As a further special feature, each valve holding bore 13 arranged in the second valve row Y is in each case connected to the nearest low pressure accumulator bore 5 via a dedicated pressure medium duct 14, and therefore two pressure medium ducts 14 connected to the second valve row Y open into each end of the two low pressure accumulator bores 5, arranged between which pressure medium ducts there is in each case one further pressure medium duct 14, which connects each suction side of the pump bore 8 to the nearest low pressure accumulator bore 5. This results in a particularly small dead space volume for the secondary region of each brake circuit (i.e. between the outlet valve, which is closed in the home position, and the pump suction side), thereby simplifying the evacuation and filling of the hydraulic unit with brake fluid.

The invention claimed is:

1. A hydraulic unit for a slip-controlled braking system comprising:
    a housing body in the form of a block, which accommodates inlet valves in a plurality of valve holding bores of a first valve row and outlet valves in a second valve row;
    a pump bore, which is arranged in the housing body and is aligned between two valves, transversely to a direction of entry of the valve holding bores;
    a motor holding bore, opening into the pump bore, for accommodating an electric motor, said motor holding bore being directed parallel to the valve holding bores into a flange surface of the housing body;
    a pair of low pressure accumulator bores arranged in parallel, which open into the housing body next to the second valve row;
    a plurality of pressure medium ducts, which connect the valve holding bores, the low pressure accumulator bores and the pump bore, and which are configured to establish a hydraulic connection between a pair of brake pressure master ports opening into the housing body and a plurality of wheel brake ports;
    a cable through-bore in the housing body for connection of the electric motor to a control unit;
    at least one further bore which opens into the housing body in the same direction as the cable through-bore, being covered by the electric motor and/or the control unit in addition to the cable through-bore;
    at least one pair of screw bores passing through the housing body on opposing sides of the cable through-bore, the at least one pair of screw bores configured to ensure electrical contact within the cable through-bore using a screw fastener arranged within each of the at least one pair of screw bores; and
    the pair of brake pressure master ports opening into the flange surface, the brake pressure master ports passing through the housing body on opposing sides of the cable through-bore such that each brake pressure master port is positioned outside of a respective one of the screw bores.

2. The hydraulic unit as claimed in claim 1, wherein the at least one further bore is a leakage receiving bore, which is a blind bore and opens into the housing body between the low pressure accumulator bores and the second valve row, substantially parallel to the cable through-bore.

3. The hydraulic unit as claimed in claim 2, wherein the leakage receiving bore is connected via a leakage duct, which extends in the housing body transversely to the cable through-bore, to a region of the motor holding bore into which the pump bore opens.

4. The hydraulic unit as claimed in claim 3, wherein the leakage duct and the low pressure accumulator bores open parallel to the flange surface into a first side face of the housing body, the leakage duct being arranged between the two low pressure accumulator bores and being closed at the first side face.

5. The hydraulic unit as claimed in claim 1, wherein the at least one pair of screw bores pass through the housing body, next to the cable through-bore and the two low pressure accumulator bores, said screw bores being penetrated, after the closure of the cable through-bore and the leakage receiving bore, by the screw fastener provided for fastening the electric motor to the housing body.

6. The hydraulic unit as claimed in claim 5, wherein the screw bores pass through the housing body and also a periphery of the electric motor parallel to the cable through-bore and parallel to the leakage receiving bore, and,
    wherein when the electric motor is fastened to the housing body, the control unit arranged on the housing body diametrically with respect to the electric motor is fastened by the screw fastener for the electric motor.

7. The hydraulic unit as claimed in claim 1, wherein the two brake pressure master ports open into the flange surface directly next to the first valve row, the brake pressure master ports being arranged approximately in a section plane of the housing body in which two wheel brake ports, which open into a second end face arranged diametrically with respect to a first end face, are aligned.

8. The hydraulic unit as claimed in claim 7, wherein at least one noise damping chamber embodied as a blind bore opens as a further bore into the housing body next to the cable through-bore, said chamber being arranged either between or outside the first valve row.

9. The hydraulic unit as claimed in claim 8, wherein the noise damping chamber is arranged parallel to the cable through-bore in the housing body.

10. The hydraulic unit as claimed in claim 8, wherein the noise damping chamber opens into the housing body between the cable through-bore and one of the two brake pressure master ports.

11. The hydraulic unit as claimed in claim 8, wherein the noise damping chamber is arranged between a through-bore provided for fastening the electric motor in the housing body and the first valve row.

12. The hydraulic unit as claimed in claim 8, wherein the noise damping chamber is covered by fastening either the control unit or the electric motor to the housing body.

\* \* \* \* \*